United States Patent [19]

Garrett

[11] Patent Number: 5,420,915
[45] Date of Patent: May 30, 1995

[54] APPARATUS FOR INSTRUCTION IN USE OF TELEPHONE

[76] Inventor: Timothy E. Garrett, 7847 East Pkwy., Sacramento, Calif. 95823

[21] Appl. No.: 981,842

[22] Filed: Nov. 25, 1992

[51] Int. Cl.$^6$ .................. H04M 3/08; H04M 17/00
[52] U.S. Cl. ............................ 379/143; 379/21; 379/144; 379/154; 379/155
[58] Field of Search ............... 379/21, 143, 144, 154, 379/155, 201; 434/321, 379

[56] References Cited

U.S. PATENT DOCUMENTS

| | | | |
|---|---|---|---|
| 4,015,091 | 3/1977 | Rao et al. | 179/84 R |
| 4,267,646 | 5/1981 | Hagwell | 434/379 |
| 4,307,266 | 12/1981 | Messina | 379/97 |
| 4,436,960 | 3/1984 | Harmon, Jr. | 179/51 AA |
| 4,456,791 | 6/1984 | Forestier | 179/84 R |
| 4,505,358 | 3/1985 | Sielaff | 179/179 |
| 4,539,435 | 9/1985 | Eckmann | 434/321 |
| 4,577,072 | 3/1986 | Lulay | 179/175 R |
| 4,578,542 | 3/1986 | Alderman | 179/84 L |
| 4,685,122 | 8/1987 | Deveson et al. | 379/201 |
| 4,686,700 | 8/1987 | Perry | 379/177 |
| 4,974,257 | 11/1990 | Ibanez et al. | 379/144 |
| 5,157,708 | 10/1992 | Garthwaite et al. | 379/21 |

FOREIGN PATENT DOCUMENTS 0112249  5/1991  Japan ...................... 379/21

OTHER PUBLICATIONS

"Phone-Line Simulator" by John Carter, Electronics Now, Aug. 1993.
Teletone Corp.; "Technical Practice Section TLS-3-120"; 1987; TLS-3 Telephone Line Simulator.
Micro Seven Inc.; "Mini-PBX Simulator for Testing Modem DAAs LS100 and LS200"; 1985; Simulate Telephone Lines.
Conway Engineering, Inc.; "The Phone-A-Lyzer Phone Test Set"; May 1991; KCL Issue 3.
Teltone; "Applications for the TLS-3 and TLS-4 Telephone Line Simulators"; Teltone.
Teltone; "Demonstrate Your Telecom Equipment of the Fly"; Nov. 1991; Teltone TLS-3/4 Issue 1, Sep. 10, 1991.
Teltone; "Telecommunications. Solutions for Sale"; 1991; CL-SOL., Issue 1, Mar. 1, 1991.
Teltone; "TLS-4 Telephone Line Simulator User Manual"; Sep. 27, 1991; Technical Practice TLS-4-120 Issue 1.
BK Precision; "Telephone Product Tester Instruction Manual Model 1045A".
Teltone; "Demo or Test Telecom Equipment Almost Anywhere"; 1990; TSL-3 Telephone Line Simulator; Technical Practice Section TLS-3-120 General Description—Issue 4.
Micro Seven, Inc.; "Computer-Based Modum Test Station with IEEE-488/RS232C Interfaces"; 1987; Programmable Interface Option for Mini-PBX Simulator.
Micro Seven, Inc.; "Operator's Manuel Models LS100/LS200 Mini-PBX Simulator"; 1983; Operator's Manuel.
Conway Engineering, Inc.; "The Phone-A-Lyzer Phone Test System"; 1991; KCL—Issue 3.

*Primary Examiner*—Stephen Chin
*Assistant Examiner*—Vijay Shankar
*Attorney, Agent, or Firm*—John P. O'Banion

[57] ABSTRACT

A portable apparatus for demonstrating the operation of one or more telephones by simulating an active telephone line in which a ring tone generator (74), busy tone generator (72), dial tone generator (70), confirmation tone generator (146) and power ringer (52) are operationally controlled by a microprocessor (62) responsive to the on-hook and off-hook status of a telephone connected to the apparatus as well as control signals established by keypad entry or programmed operation. A decoder (64) responsive to DTMF or pulse dial signals provides for universal operation without regard to the type of telephones connected to the apparatus. Communications over the telephones can be monitored with an external speaker (38) or headphones, or recorded for later review. The apparatus also provides for simulated operation of coin-operated and calling card operated telephones.

16 Claims, 8 Drawing Sheets

APPARATUS FOR INSTRUCTION IN USE OF TELEPHONE

BACKGROUND OF THE INVENTION

1. Field of the Invention

This invention relates generally to instructional aids for children and handicapped persons, and more particularly to an apparatus for instructing a person in the use of a telephone.

2. Description of the Background Art

Telephones are in use in nearly every home and office in the civilized world, and constitute instruments which are constantly relied upon for communications with others. To date, instruction in use of the telephone and in telephone etiquette has been presented in a variety of limited forms. In many cases, the instructions are given orally or in writing without the benefit of "hands on" demonstration of such features as dial tones, busy tones, ringing, and connection. In other cases where "hands on" demonstration is provided, it is provided by using a telephone which is connected to an active line. This can result in the line being temporarily taken out of service or in the inadvertent dialing of numbers such as the 911 emergency response number. Additionally, it is often not practical for students to engage in practice and experimentation at their convenience or as often as they desire. Therefore, there is a need for an apparatus which can simulate actual use of a telephone and which can be used by a student independently or with the aid of an instructor.

SUMMARY OF THE INVENTION

The present invention generally comprises an apparatus for instructing a person in the use of telephone operating procedures and in telephone etiquette. The apparatus includes jacks for connecting one or more standard telephones or a coin-operated telephone simulator, and is programmable to operate in any one of six selected modes.

In the manual mode, the user is able to depress a "dial tone" button which will produce a dial tone in whichever telephone is off-hook. Similarly, by depressing a "busy tone" or "ring tone" button, the user is able to simulate a busy tone or ring tone to whichever telephone is off-hook, and a power ring signal to whichever telephone is on-hook.

In the program mode, the user can program one or more telephone numbers into memory. The telephone number programmed can be of any standard length and combination. A "display" button is provided to display the programmed number, an "add" button is provided to store a number in memory, and a "delete" button is provided to erase a number from memory.

In the auto mode, the telephones connected to the apparatus are engaged to function as if they were connected to active telephone lines. When a handset is lifted, the telephone will come off-hook and a dial tone will be heard. A telephone number can then be dialed and, if it matches a number previously stored in memory, the second telephone will ring. If the second telephone is off-hook at that time, a busy tone will be heard.

In the coin mode, a coin telephone simulator is connected to the apparatus for simulation of the operation of a conventional coin telephone. All manual controls function as previously described.

The calling card mode allows user programmable simulation of a calling card using two or three sets of telephone numbers and three types of confirmation tones.

In the auto calling card mode, the apparatus will look for two or three sets of telephone numbers and provide appropriate confirmation tones.

An amplifier and speaker included in the apparatus permit the user to monitor all audible communications taking place over the telephones connected to the apparatus. In addition, a jack is provided to permit tape recording of such audible communications so that the user can obtain feedback on his or her telephone etiquette and speech. Another jack is provided to accept headphones for silent monitoring. A microphone jack is also provided so that an instructor can use a microphone to simulate acting as a telephone company operator.

An object of the invention is to provide educators with a device to teach the basic functions of telephone operation.

Another object of the invention is to simulate the functions of a telephone company's switching equipment.

Another object of the invention is to teach children how to dial the 9-1-1 emergency response system without accessing a telephone line.

Another object of the invention is to simulate the operation of a telephone switching circuit.

Another object of the invention is to simulate calling card or coin telephone operation.

Another object of the invention is to provide for recording and playback of simulated telephone communications for enhancing telephone etiquette or providing speech therapy.

Further objects and advantages of the invention will be brought out in the following portions of the specification, wherein the detailed description is for the purpose of fully disclosing preferred embodiments of the invention without placing limitations thereon.

BRIEF DESCRIPTION OF THE DRAWINGS

The invention will be more fully understood by reference to the following drawings which are for illustrative purposes only.

DESCRIPTION OF THE PREFERRED EMBODIMENTS

Referring more specifically to the drawings, for illustrative purposes the present invention is embodied in the apparatus generally shown in drawing FIG. 1 through FIG. 8. It will be appreciated that the apparatus may vary as to configuration and as to details of the parts without departing from the basic concepts as disclosed herein.

Figure 1:
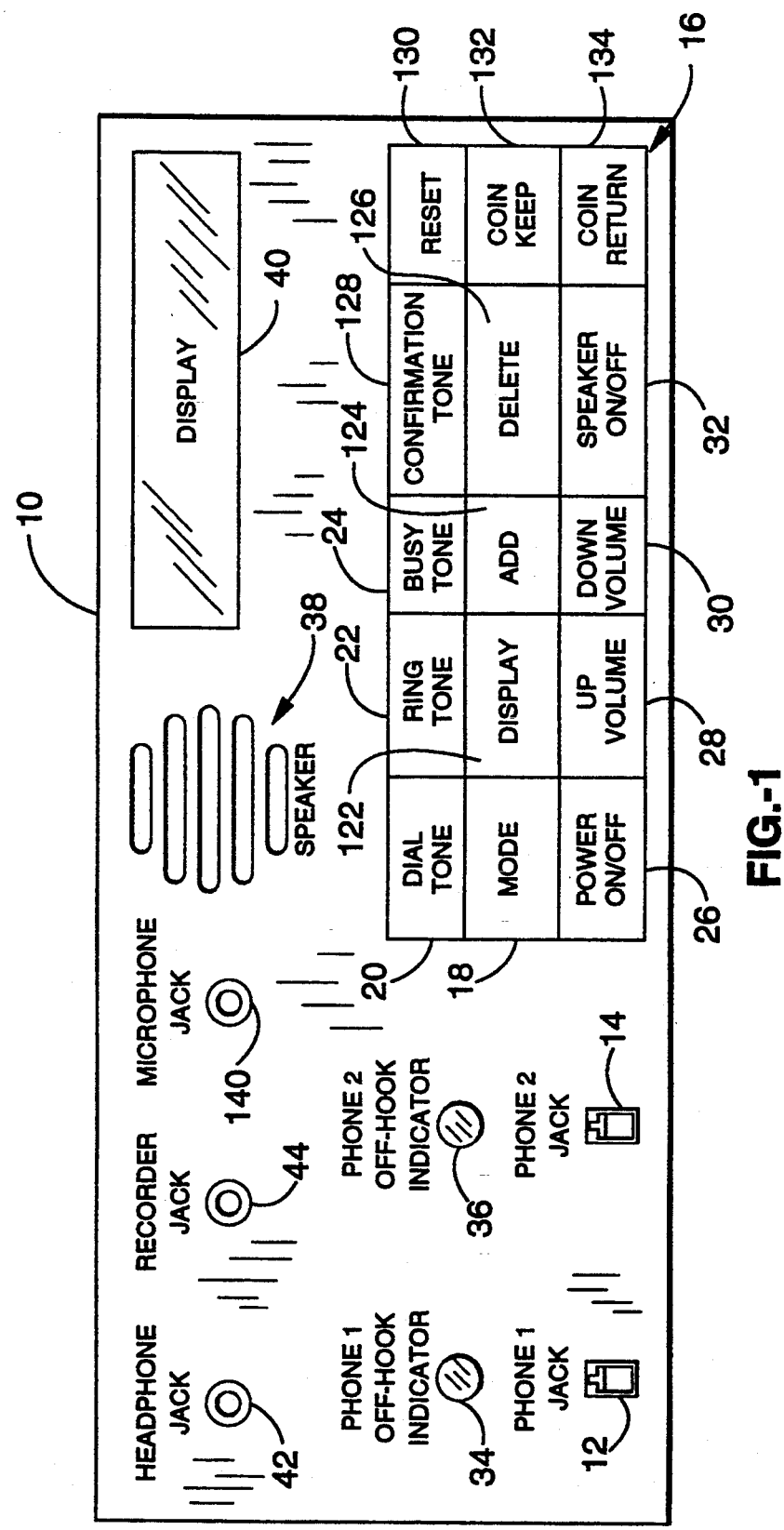
FIG. 1 is a front elevation view showing the control panel of the present invention.

As can be seen in FIG. 1, the apparatus includes a front panel which contains the controls for operation of the apparatus. The apparatus is generally self-contained in a housing 10 which encloses all of the circuitry employed, including a power supply for operation of the apparatus on batteries or an external source. One or more conventional telephone sets can be connected to the front panel by means of telephone jacks 12, 14, respectively. Telephone jacks 12, 14 are preferably four wire RJ-11 type modular telephone jacks but can be of any configuration which permits the attachment of a telephone to the apparatus. In addition, a coin telephone simulator can be connected to telephone jack 12 and a conventional telephone plugged into the coin telephone simulator.

Keypad 16, which is a membrane keypad, series of switches, or the like, provides access to the apparatus for carrying out its basic operational functions. Mode select key 18 serves to select a manual mode, a program mode, an automatic mode, a coin mode, a calling card program mode, or an auto calling card mode. By continuing to depress mode select key 18, the user can continuously rotate through these six modes.

In the manual mode, by depressing dial tone key 20, ring tone key 22 or busy tone key 24, the user can respectively generate a dial tone, ring tone, or busy tone in the receiver of an off-hook telephone which is connected to either jack 12 or jack 14. Additionally, depressing ring tone key 22 will cause the ringer to be activated in an on-hook telephone connected to telephone jack 12 or telephone jack 14.

In the program mode, the user can program a telephone number of any standard length and combination into memory through the touch tone keypad on a telephone connected either to telephone jack 12 or telephone jack 14. As a telephone number is entered it is displayed on a display 40 which can be a liquid crystal, light emitting diode or similar visual display capable of displaying sixteen positions of numeric or alphanumeric characters. By depressing add key 124, the telephone number will be stored into memory. Similarly, if a telephone number is already stored in memory, by depressing delete key 126 the telephone number will be erased. If the user desires to view a telephone number which has been previously stored in memory, by depressing display key 122 the telephone number will be displayed on display 40.

Use of the automatic mode requires connection of a first telephone to telephone jack 12 and a second telephone to telephone jack 14. In this mode, the telephones connected to telephone jacks 12, 14 will operate in the same manner as if connected to an active telephone line. For example, if the telephone connected to telephone jack 12 is taken off-hook, a dial tone will be heard in the receiver. If the user then dials a telephone number and that telephone number matches the telephone number which has been previously stored in memory in the apparatus, the telephone which is connected to telephone jack 14 will ring and the originator will hear a ring tone in the receiver of the telephone connected to telephone jack 12. If the telephone connected to telephone jack 14 is off-hook at the time, the user will hear a busy tone in the receiver of the telephone connected to telephone jack 12. Similarly a "call" can be initiated by the telephone connected to telephone jack 14. Indicators 34, 36 are typically light emitting diodes or similar devices to give visual indication that a telephone connected to telephone jack 12 or telephone jack 14 is off-hook, respectively.

In the coin mode, a coin telephone simulator is typically connected to telephone jack 12 and a conventional telephone is plugged into the coin telephone simulator. Alternative connections can be made so long as both the telephone and the coin telephone simulator are properly connected to the telephone jack 12. In this mode, dial tone key 20, ring tone key 22 and busy tone key 24 operate as they would without the coin telephone simulator connected. Display 40 will display a cumulative total of the amount of money deposited into the coin telephone simulator as well as the telephone number dialed. Five characters of the display are reserved for the amount of money deposited, including a cents sign, while eleven digits of the display are reserved for the telephone number. When operating in this mode, the portion of the display showing the amount of money deposited can be reset to zero by pressing display key 122 (operating in a clear money display mode). Similarly, the telephone number portion of the display can be cleared by pressing add key 124 (operating in a clear telephone number display mode). The user can choose to either keep coins deposited or to return coins by pressing coin keep key 132 or coin return key 134, respectively. In addition, to simulate communication with a telephone company operator, a microphone can be connected to microphone jack 140.

In the calling card program mode, either two or three sets of telephone numbers can be programmed and up to three confirmation tones generated. Once entering this mode by pressing mode key 18, display 40 will prompt the user by asking if two sets of telephone numbers will be used. If two sets are to be used, add key 124 (operating in an enter mode) is pressed. If three sets are to be used, display key 122 (operating in an option select mode) is pressed. Display 40 will then prompt the user by asking if three sets of telephone numbers will be used. If three sets are to be used, then add key 124 is pressed. Otherwise mode key 18 can be pressed to exit. When the desired telephone number set is selected, display 40 prompts the user to enter a type of confirmation tone to be generated after the first telephone number is dialed. By entering a "1", "2" or "3" on the touch tone keypad of the telephone, a continuous single frequency tone, a stutter tone, or a one-second dial tone can be selected, respectively. If three sets of telephone numbers were selected, display 40 will prompt the user to enter a type of confirmation tone to be generated after the second telephone number is dialed. Thereafter, this mode is exited and the calling card auto mode is selected.

In the calling card auto mode, the user dials a first telephone number which can be up to fourteen digits in length. If the number dialed was previously programmed into memory, then the corresponding confirmation tone programmed with the telephone number is generated. If no telephone number was stored in memory, the a busy signal is generated. The user then dials the second telephone number. If that telephone number was previously programmed into memory, and the option for two number sets was selected, the call is completed and the other telephone rings. If the option for three number sets was selected, then a second confirmation tone is generated. The user then dials the third telephone number and, if that number was previously programmed into memory, the call is completed and the other telephone rings. Otherwise, a busy signal is generated and the procedure must be restarted.

The remaining keys on keypad 16 provide the following functions. Power key 26 powers the apparatus on and off; volume up key 28 increases the volume of speaker 38 or the volume to headphones connected to headphone jack 42; volume down key 30 decreases the volume of speaker 38 or the volume to headphones connected to headphone jack 42; speaker key 32 turns speaker 38 on and off; and reset key 130 resets the apparatus to manual mode in the event of a need to return to manual mode or power up state.

In addition to providing the dial and status functions described above, the apparatus establishes a standard voice path by routing audio between a telephone which is connected to telephone jack 12 and a telephone which is connected to telephone jack 14. In the event that the user or an instructor desires to monitor communications between the telephones, speaker 38 can be switched on and off. Similarly, if silent monitoring is desired, headphones can be connected to headphone jack 42. For purposes of speech therapy, replay of communications, and the like, a tape recorder or other recording instrument can be connected to recorder jack 44.

Figure 2:
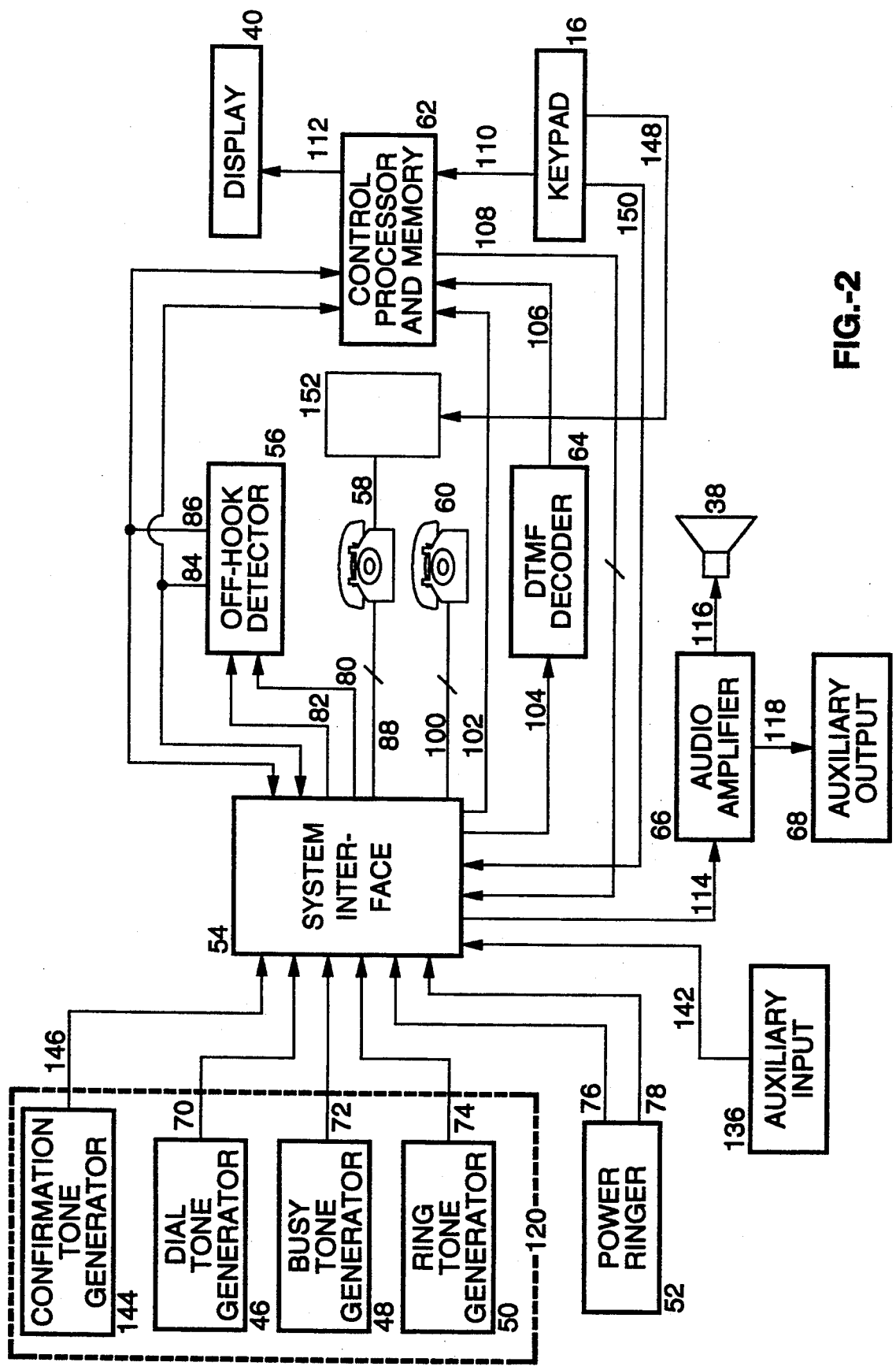
FIG. 2 is a functional block diagram of the present invention.
Figure 6:
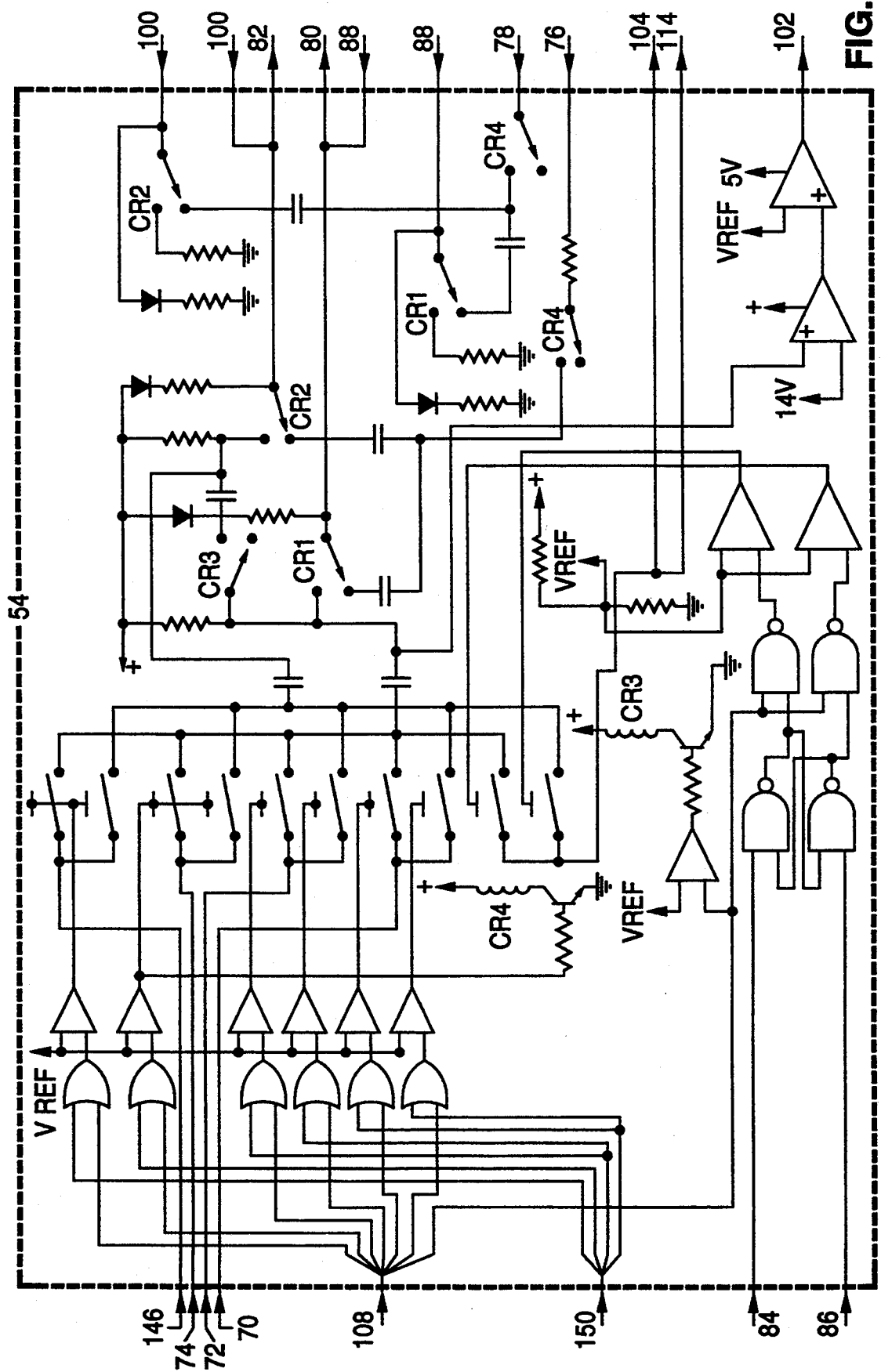
FIG. 6 is a schematic diagram of the system interface circuitry of the apparatus shown in FIG. 2.

Referring now to FIG. 2, audio and electrical signals are routed between functional components through system interface 54. System interface 54 comprises conventional wiring and circuitry as is shown in FIG. 6.

Figure 3:
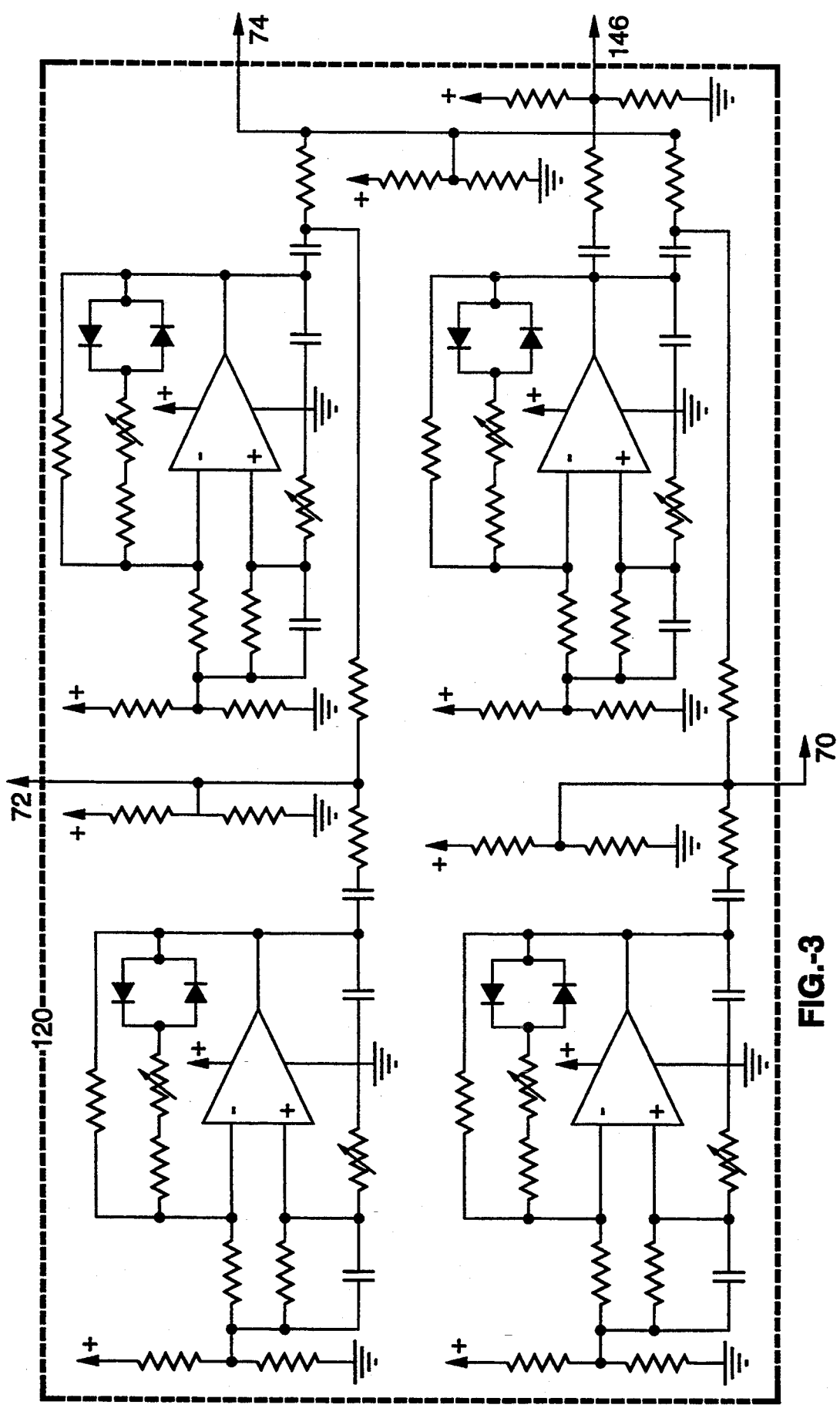
FIG. 3 is a schematic diagram of the tone generator circuitry of the apparatus shown in FIG. 2.

Dial tone generator 46, busy tone generator 48, ring tone generator 50, and confirmation tone generator 144 are electrically coupled to system interface 54 through interconnection 70, interconnection 72, interconnection 74, and interconnection 146, respectively. Referring also to FIG. 3, these elements are contained within tone generator module 120, which can comprise conventional analog circuitry or its equivalent.

Figure 4:
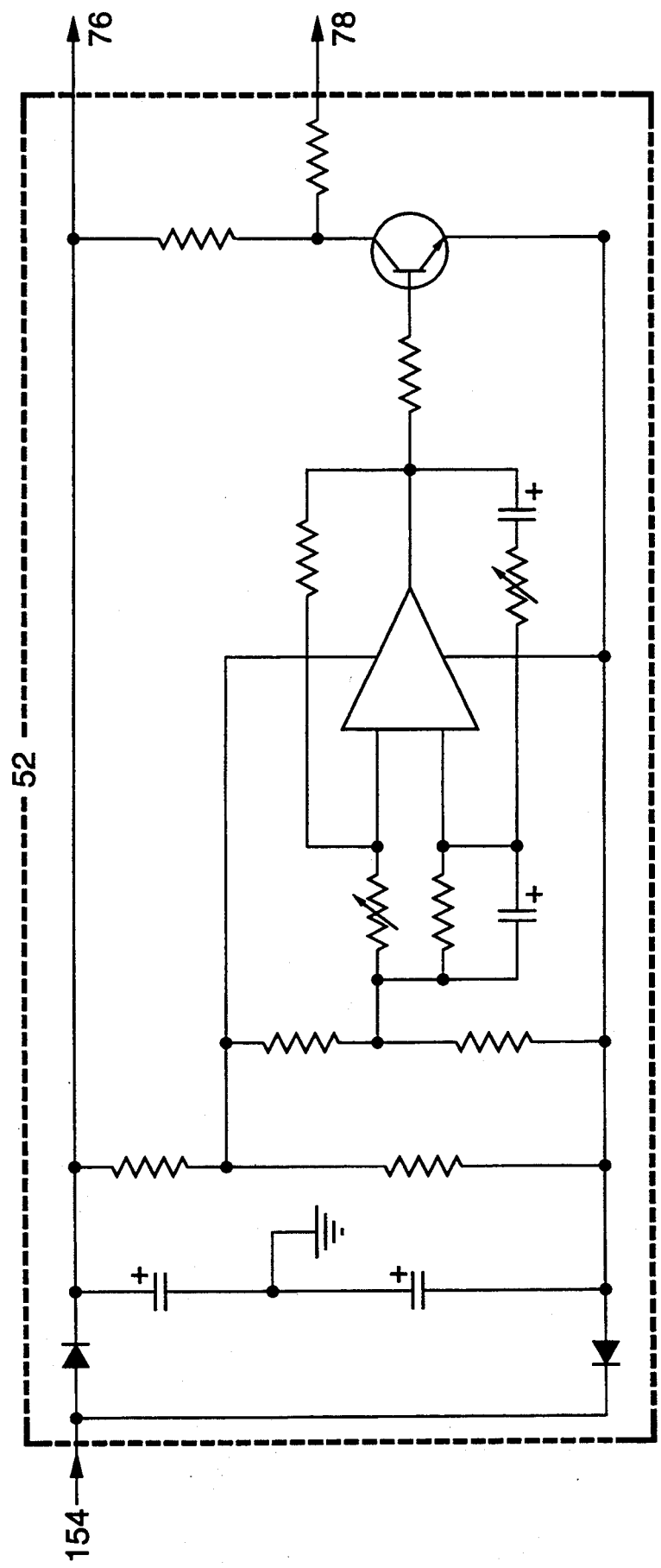
FIG. 4 is a schematic diagram of the power ringer circuitry of the apparatus shown in FIG. 2.

Referring also to FIG. 4, power ringer 52 is electrically coupled to system interface 54 through interconnections 76, 78. Power ringer 52 generates a twenty hertz signal to activate the ringer circuit in either telephone 58 or telephone 60. An alternating current supply voltage is coupled to power ringer 52 through interconnection 154.

Figure 5:
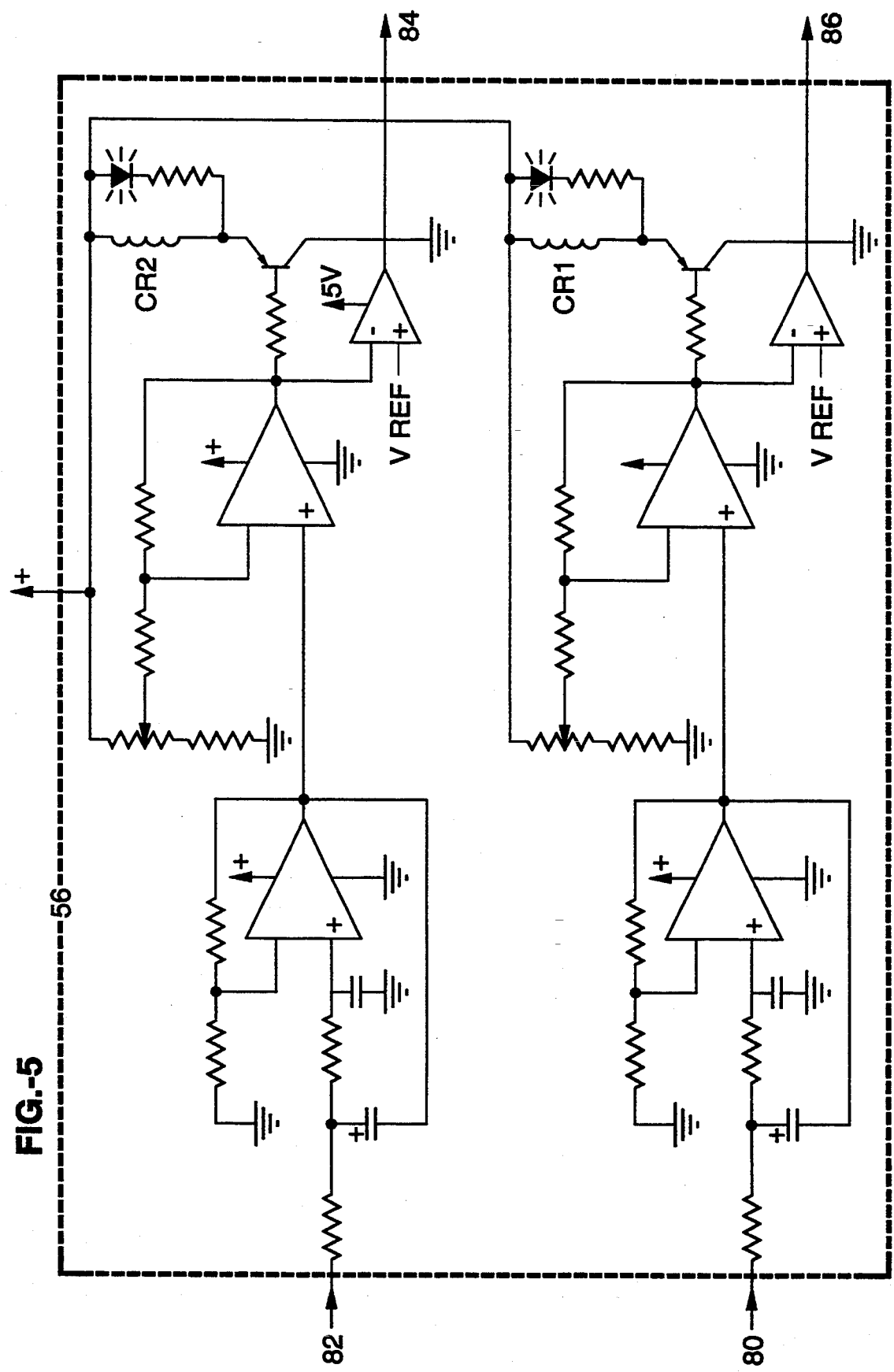
FIG. 5 is a schematic diagram of the off-hook detection circuitry of the apparatus shown in FIG. 2.

Referring also to FIG. 5, off-hook detector 56 is electrically coupled to system interface 54 through several interconnections. Interconnection 80 and interconnection 82 receive an off-hook signal from a telephone connected to telephone jack 12 and a telephone connected to telephone jack 14, respectively. These off-hook signals are direct current voltage level signals which are logic high when an on-hook condition exists and logic low when an off-hook condition exists. The off-hook signal is amplified and filtered by means of conventional operational amplifier and filtering elements as shown in FIG. 5, and energizes the corresponding coil of relay CR1 or CR2. Note that power ringing signals are effectively filtered and blocked from energizing relays CR1 and CR2. Indicator 34 and indicator 36 (FIG. 1) are coupled in parallel with the coils of relays CR1 and CR2, respectively, to provide a visual indication of the off-hook condition.

Referring now to FIG. 6, off-hook detection signals are routed through interconnection 84 and interconnection 86 to a "first off-hook" detector which comprises of logically coupled NAND gates as shown. This circuitry serves to permit only the first telephone taken off-hook to be connected to DTMF decoder 64 and audio amplifier 114. In this way, it is not possible to initiate a dialing sequence from both telephones at the same time.

Relay CR3 is activated by control processor 62 to establish a "talk path" between interconnection 88 and interconnection 100 for communication between telephone 58 and telephone 60. This "talk path" is controlled by controller processor 62 over interconnection 108 which includes a "talk path" control line coupled to both relay CR3 and to the "first off-hook" NAND gate logic so that when the "talk path" is activated, audio amplifier 66 and DTMF decoder 64 will receive signals from both telephones.

In an on-hook condition, telephone jack 12 (which is coupled to interconnection 88) is connected through the contacts of CR1 to high impedance paths to ground and to supply voltage. This enables the power ringing signal which is available at interconnections 76, 78 and which is applied by activating relay CR4, to adequately power a standard telephone ringer in telephone 58 which is coupled to interconnection 88. This high impedance path will also allow sufficient direct current to be generated for operation of the off-hook detection circuitry.

When an off-hook condition is detected at interconnection 88, relay CR1 is energized and one side of interconnection 88 is connected to a low impedance path to ground while the other side is connected to supply voltage. At the same time, interconnection 88 is disconnected from the path to interconnection 78 through relay CR4 so that the power ring signal can no longer be applied. In this configuration, sufficient power is coupled to interconnection 88 to operate a standard telephone and its tone generator, as well as to allow a user to hear a dial tone, busy tone, and ringing tone in the receiver.

Operation is identical for telephone jack 14 (which is coupled to interconnection 100) except that control paths are routed through relay CR2 for operation of telephone 60.

Interconnection 84 and interconnection 86 also route off-hook detection signals to control processor 62. Control processor 62 decodes those signals and, if an off-hook status is detected, generates a dial tone or busy signal in either telephone 58 or telephone 60 as appropriate.

A dial pulse or coin pulse from interconnection 88 is output to control processor 62 through interconnection 102. Conventional operational amplifiers are used to convert supply voltage pulses to logic level pulses for interpretation by control processor 62.

Analog tone signals from tone generator module 120 are routed to integrated circuit switches which are controlled either by controller processor 62 through the remaining control lines of interconnection 108, or by keypad 16 through the control lines of interconnection 150. Upon activation of the integrated circuit switches by control processor 62 or keypad 16, the appropriate tones will be routed to interconnection 88 or interconnection 100 through relay CR1 or relay CR2, respectively.

Control processor 62 is typically an Intel 8751 or the like, and includes read-only memory and volatile and non-volatile random access memory. Control processor 62 interprets signals generated by keypad 16 which is electrically coupled to control processor 62 through interconnection 110, and executes the corresponding function. In addition, control processor 62 provides for simulation of the operation of active telephone lines during automatic operation as described above, as well as for programming and storing a telephone number. Telephone numbers stored in control processor 62 can be displayed on display 40 which is electrically coupled to control processor 62 through interconnection 112.

DTMF decoder 64 is electrically coupled to system interface 54 through interconnection 104 and to controller processor 62 through interconnection 106. DTMF decoder 64, which is a Motorola MC145436 or equivalent, decodes touch tone signals generated by either telephone 58 or telephone 60 for purposes of programming and storing a telephone number in control processor 62, or for purposes of comparing a dialed telephone number with the telephone number stored in control processor 62 during automatic operation as described above. In the event that either telephone 58 or telephone 60 is a rotary telephone, control processor 62 will decode pulse signals received over interconnection 102. Command signals generated by control processor 62 to operate specific circuit elements are sent to system interface 54 over interconnections 108 which typically comprise seven logic lines. Command signals generated manually by keys on keypad 16 to operate specific circuit elements are sent to system interface 54 over interconnections 150 which typically comprise four logic lines.

Audio amplifier 66 which is electrically coupled to speaker 38 through interconnection 116 provides for external monitoring of communications between the user of telephone 58 and the user of telephone 60. Audio amplifier 66 is electrically coupled to system interface 54 through interconnection 114 and is electrically coupled to auxiliary output bus 68 through interconnection 118. Auxiliary output bus 68 includes headphone jack 42 and recorder jack 44 (FIG. 1). System interface 54 is also electrically connected to auxiliary input bus 136 through interconnection 142. Auxiliary input bus 136 includes microphone jack 140.

Coin telephone simulator 152 can be electrically coupled to telephone jack 12 through interconnection 88 and, therefore, would also be electrically coupled to telephone 58. Through this interconnection, pulse signals are sent to control processor 62 when coins are inserted in coin telephone simulator 152, the number of pulses being dependent upon and determining the amount of money inserted. Coin telephone simulator 152 would also be electrically connected to keypad 16 through interconnection 148. That interconnection would route signals from keypad 16 to return or keep the coins in coin telephone simulator 152. Similarly, use of a credit card in a telephone could be simulated by expanding the memory of control processor 62 to permit the storage of a number against which the credit card number would be compared. If the numbers matched, control processor 62 would permit the call to be routed to the other telephone.

Figure 7:
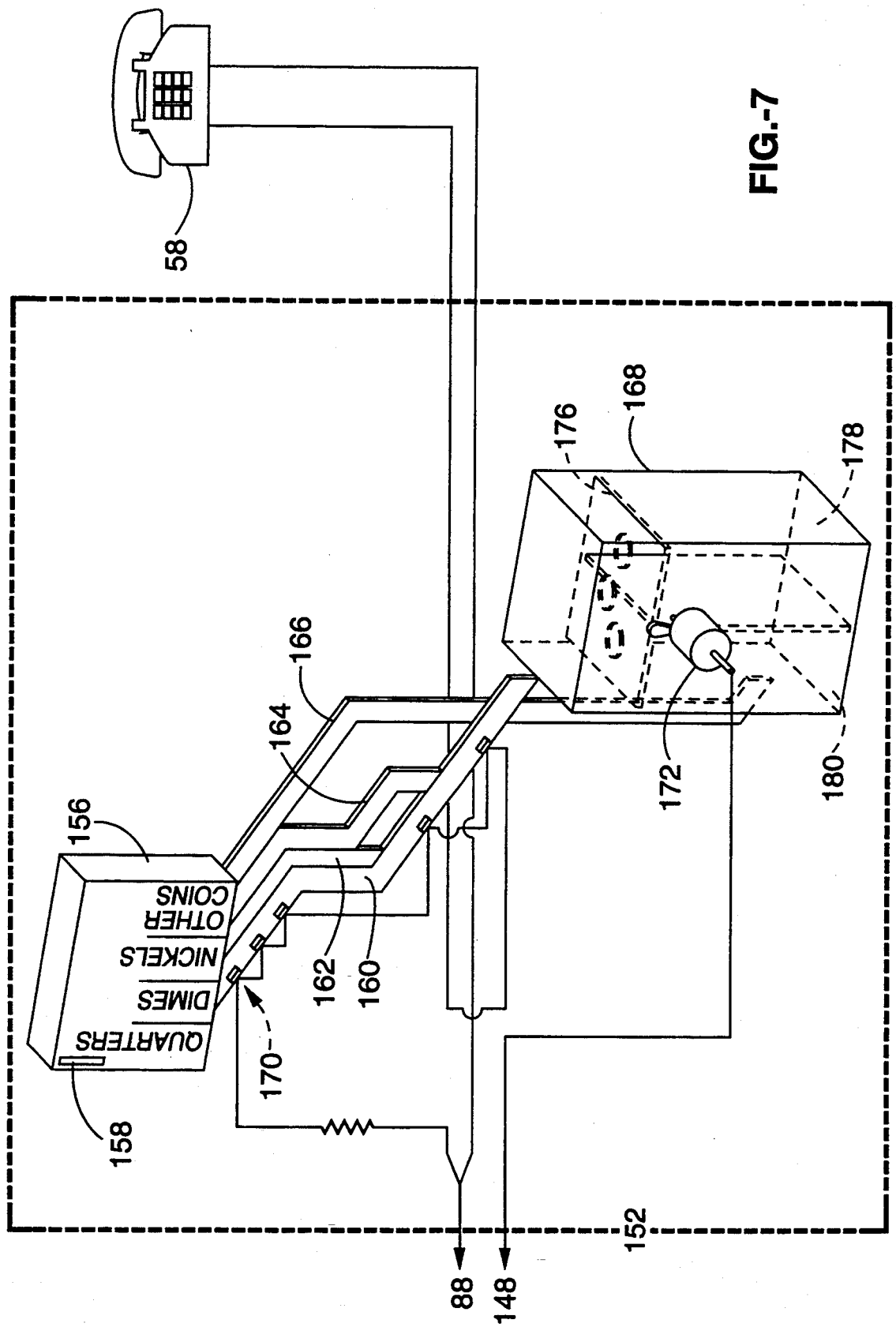
FIG. 7 is a diagrammatic view of the coin telephone simulator portion of the present invention.

Referring now to FIG. 7, coin telephone simulator 152 includes a coin separator 156 into which coins are inserted through slot 158. The inserted coins are separated according to size and routed to one of several feed tubes 160, 162, 164, 166 from which the coins roll into coin box 168. As the coins roll down the feed tubes, they activate one of several normally closed switches 170 depending upon the size of the coin and value. For example, a quarter would roll down feed tube 160 and activate five switches 170 along the way. The talk line 88 would be pulsed five times indicating five units of five cents each, or twenty-five cents. A dime would roll down feed tube 162 and into feed tube 160, thereby activating only two switches 170 along the way. Pennies rolling down feed tube 166 would not activate any of the switches 170. When a coin rolls down a feed tube it breaks the circuit established by a switch 170 and the number of pulses from activation of switches 170 is sensed by microprocessor 62 to determine the amount of money which has been deposited.

Included within coin box 168 is a motor 172 which has directional control according to the voltage applied. If control line 148 is brought to a level of twenty-four volts, then motor 172 will rotate in one direction. If control line 148 is grounded for zero volts, then motor 172 will rotate in the opposite direction. In addition, a fixed voltage of fifteen volts must be applied to motor 168 at all times. By selecting coin keep key 132 on keypad 16, motor 172 will operate so as to cause shelf 176 to rotate clockwise and cause coins resting thereon to fall into a coin keep compartment 178. Operation of coin return key 134 will cause motor 172 to operate so as to cause shelf 176 to rotate counterclockwise and cause coins resting thereon to fall into a coin return compartment 180.

Figure 8:
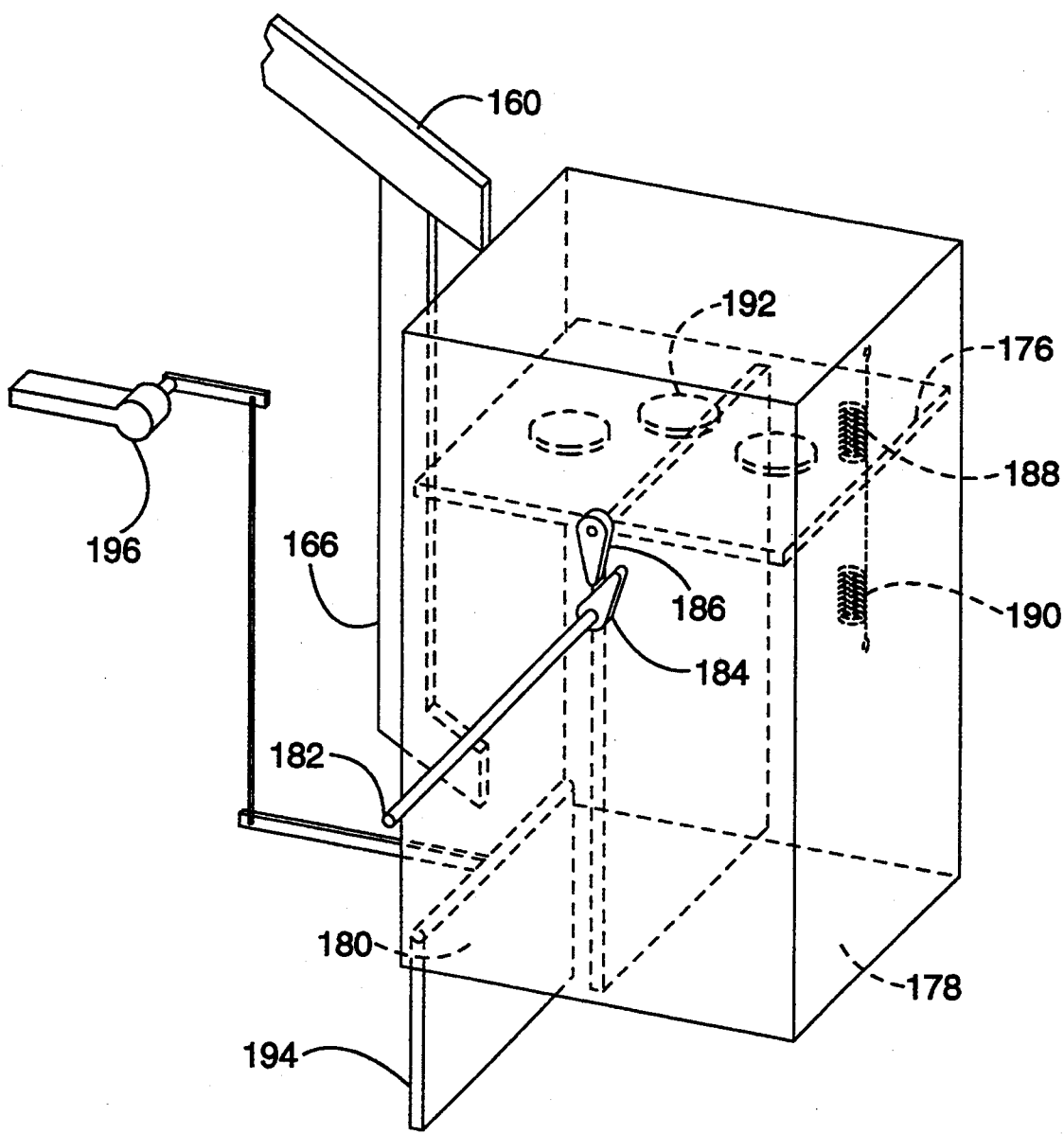
FIG. 8 is a detailed diagrammatic view of the coin release mechanism shown in FIG. 7.

Referring now to FIG. 7 and FIG. 8, motor 172 is coupled to a shaft 182 which is in turn coupled to a cam 184 at one end. Shelf 176 is similarly coupled to a cam 186 at one edge, and cams 184, 186 are positioned for engagement upon rotation of shaft 182. Return springs 188, 190 ensure that shelf 176 will return to a horizontal position after rotation of shaft 182. When a coin 192 falls into coin return compartment 180, it will come to rest on a coin return door 194 which is normally closed. Coin return lever 196 is then operated to release the coin to the user.

Accordingly, it will be seen that this invention provides a self-contained telephone operation simulator for teaching children, handicapped persons, and other how to use a telephone without risking use of an active line. Although, the description above contains many specificities, these should not be construed as limiting the scope of the invention but as merely providing illustrations of some of the presently preferred embodiments of this invention. Thus the scope of this invention should be determined by the appended claims and their legal equivalents.

I claim:

1. A self-contained portable apparatus for demonstrating the use of a telephone by simulating the operation of an active telephone line, comprising:
   (a) tone generator means for generating a dial tone, busy tone, and ring tone in a telephone;
   (b) control processor means for operatively controlling said tone generator means and selectively generating a respective one of said tones;
   (c) keypad means for accessing said control processor means, said keypad means including a plurality of keys;
   (d) said control processor means including mode select means for operating in a manual mode, an automatic mode, and a program mode, said manual mode configured for operatively controlling said tone generator means in response to activation of at least one of said keys in said keypad means, said automatic mode configured for simulating operation of an active telephone line, said program mode configured for storing at least one telephone number in said control processor means;
   (e) power ringer means for activating a ringer circuit in said telephone, said power ringer means operatively responsive to said tone generator means;

(f) interface means for operationally interfacing said tone generator means, said control processor means, said keypad means, said power ringer means, and said telephone; and (g) off-hook detector means for detecting off-hook status of said telephone, said off-hook detector means electrically coupled to said interface means, said off-hook detector means electrically coupled to said control processor means, said busy tone being generated in response to detection of said off-hook status.

2. An apparatus as recited in claim 1, wherein said control processor means includes calling card means for simulating operation of said telephone using a calling card, said calling card means configured for comparing a first telephone number dialed from said telephone with a first stored telephone number and generating a confirmation tone if said first dialed telephone number matches said first stored telephone number, said calling card means further configured for comparing a second telephone number dialed from said telephone with a second stored telephone number and causing a second telephone to ring if said second dialed telephone number matches said second stored telephone number.

3. An apparatus as recited in claim 2, further comprising coin telephone simulation means for simulating operation of a coin operated telephone, said coin telephone simulation means including means for displaying the cumulative value of one or more coins deposited, said coin telephone means including means for returning said deposited coins to a user, said coin telephone means including means for retaining said deposited coins.

4. An apparatus as recited in claim 1, further comprising:
 (a) means for comparing a stored telephone number with a telephone number dialed using said telephone and generating an output signal when said stored telephone number matches said dialed telephone number;
 (b) said power ringer means activating a ringer circuit in a second telephone in response to said output signal.

5. The apparatus recited in claim 4, further comprising DTMF decoder means for decoding DTMF dialing signals generated by said first telephone.

6. The apparatus recited in claim 5, further comprising pulse decoder means for decoding pulse dialing signals generated by said first telephone.

7. A telephone operation instructional device, comprising:
 (a) a control processor, said control processor including memory means for storing at least one telephone number, said control processor configured and structured for operation in a plurality of user selected modes;
 (b) keypad means for accessing said control processor;
 (c) said plurality of modes includes a manual mode, said manual mode configured for operatively controlling a respective one of said tone generator means in response to activation of at least one of said keys in said keypad means, an automatic mode, said automatic mode configured for simulating operation of an active telephone line, and a program mode, said program mode configured for storing at least one telephone number in said control processor means;
 (d) dial tone generator means for generating a dial tone in a telephone, said dial tone generator means operatively responsive to said control processor;
 (e) busy tone generator means for generating a busy tone in said telephone, said busy tone generator means operatively responsive to said control processor;
 (f) ring tone generator means for generating a ring tone in said telephone, said ring tone generator means operatively responsive to said control processor;
 (g) power ringer means for activating a ringer circuit in said telephone, said power ringer means operatively responsive to said ring tone generator means;
 (h) interface means for electrically coupling said dial tone generator means, said busy tone generator means, said ring tone generator means, said power ringer means, and said control processor to said telephone; and
 (i) off-hook detector means for detecting off-hook status of said telephone, said off-hook detector means electrically coupled to said interface means, said off-hook detector means electrically coupled to said control processor means, said busy tone generator operatively responsive to said off-hook status.

8. The apparatus recited in claim 7, further comprising:
 (a) means for comparing a telephone number stored in said memory with a telephone number dialed from said telephone and generating a ring signal in response to said telephone numbers matching;
 (b) said power ringer means activating a ringer circuit in a second telephone in response to said ring signal.

9. An apparatus as recited in claim 8, wherein said plurality of modes includes a calling card mode, said calling card mode configured for comparing a first telephone number dialed from said telephone with a first stored telephone number and generating a confirmation tone if said first dialed telephone number matches said first stored telephone number, said calling code mode further configured for comparing a second telephone number dialed from said telephone with a second stored telephone number and causing a second telephone to ring if said second dialed telephone number matches said second stored telephone number.

10. An apparatus as recited in claim 9, further comprising:
 (a) means for comparing a stored telephone number with a telephone number dialed using said telephone and generating an output signal when said stored telephone number matches said dialed telephone number;
 (b) said power ringer means activating a ringer circuit in a second telephone in response to said output signal.

11. An apparatus as recited in claim 10, further comprising DTMF decoder means for decoding DTMF dialing signals generated by said first telephone.

12. An apparatus as recited in claim 11, further comprising pulse decoder means for decoding pulse dialing signals generated by said first telephone.

13. An apparatus as recited in claim 12, further comprising coin telephone simulating means for simulating the operation of a coin operated telephone, said coin telephone simulating means including means for displaying the cumulative value of one or more coins deposited, said coin telephone simulating means including means for returning said deposited coins to a user, said coin telephone simulating means including means for retaining said deposited coins.

14. A device for simulating operation of a telephone system for teaching the use thereof, comprising:
(a) a control processor, said control processor including an information storage device, said control processor coupled to a keypad having a plurality of keys, said control processor configured and structured for operation in a selected one of a plurality of modes, said modes including a manual mode configured for operatively controlling said tone generator means in response to activation of at least one of said keys in said keypad, an automatic mode configured for simulating operation of an active telephone line, and a program mode configured for entering storing at least one telephone number in said information storage device;
(b) a telephone jack structured and configured for connection to a telephone;
(c) a dial tone generator operatively responsive to said control processor;
(d) a busy tone generator;
(e) a ring tone generator operatively responsive to said control processor;
(f) a power ringer operatively responsive to said ring tone generator;
(g) an interface module, said interface module electrically coupled to said control processor, said keypad, said dial tone generator, said busy tone generator, said ring tone generator, said power ringer, and said telephone jack; and
(h) an off-hook detector, said off-hook detector electrically connected to said interface module, said off-hook detector electrically coupled to said telephone jack, said busy tone generator operatively responsive to said off-hook detector.

15. An apparatus as recited in claim 14, wherein said plurality of modes includes a calling card mode configured for comparing a telephone number dialed from a telephone coupled to said telephone jack with a telephone number stored in said information storage device and generating a confirmation tone if said telephone numbers match, said calling code mode further configured for comparing a second telephone number dialed from said telephone with a second stored telephone number stored in said information storage device and causing a second telephone to ring if said telephone numbers are identical.

16. An apparatus as recited in claim 15, further comprising coin telephone simulating means for simulating the operation of a coin operated telephone, said coin telephone simulating means including means for displaying the cumulative value of one or more coins deposited, said coin telephone simulating means including means for returning said deposited coins to a user, said coin telephone simulating means including means for retaining said deposited coins.

* * * * *